(12) United States Patent
Shrapnel

(10) Patent No.: US 9,139,300 B2
(45) Date of Patent: Sep. 22, 2015

(54) LOAD ATTACHMENT SYSTEM FOR HELICOPTERS

(75) Inventor: William Scrope Shrapnel, Caloundra (AU)

(73) Assignee: Helimods Pty Ltd., Caloundra (QLD) (AU)

( * ) Notice: Subject to any disclaimer, the term of this patent is extended or adjusted under 35 U.S.C. 154(b) by 152 days.

(21) Appl. No.: 13/825,181

(22) PCT Filed: Sep. 20, 2010

(86) PCT No.: PCT/AU2010/001225
§ 371 (c)(1),
(2), (4) Date: Jun. 4, 2013

(87) PCT Pub. No.: WO2012/037595
PCT Pub. Date: Mar. 29, 2012

(65) Prior Publication Data
US 2013/0270393 A1      Oct. 17, 2013

(51) Int. Cl.
| | |
|---|---|
| B64C 9/00 | (2006.01) |
| B64D 9/00 | (2006.01) |
| B64D 1/22 | (2006.01) |
| H02G 1/02 | (2006.01) |
| B64C 25/52 | (2006.01) |
| B64C 27/04 | (2006.01) |
| B64C 25/32 | (2006.01) |

(52) U.S. Cl.
CPC . *B64D 9/00* (2013.01); *B64C 25/52* (2013.01); *B64D 1/22* (2013.01); *H02G 1/02* (2013.01); *B64C 27/04* (2013.01); *B64C 2025/325* (2013.01)

(58) Field of Classification Search
CPC ............ B64D 1/22; B64D 9/00; B64C 27/04; B64C 2025/325; B64C 25/52; H02G 1/02
USPC ...................... 244/137.2, 137.4, 17.11, 118.5
See application file for complete search history.

(56) References Cited

U.S. PATENT DOCUMENTS

| | | | | |
|---|---|---|---|---|
| 3,153,521 A | * | 10/1964 | Laufer et al. | 244/17.11 |
| 3,227,401 A | * | 1/1966 | Currier | 244/137.4 |
| 4,113,207 A | * | 9/1978 | Dalziel | 244/137.2 |
| 4,458,860 A | * | 7/1984 | Ogawa | 244/17.11 |
| 5,375,795 A | * | 12/1994 | Strunk | 244/118.5 |
| 2012/0193476 A1 | * | 8/2012 | Figoureux et al. | 244/131 |

FOREIGN PATENT DOCUMENTS

WO     2005025984 A1    3/2005

OTHER PUBLICATIONS

Int'l Preliminary Report on Patentability, for priority application PCT/AU2010/001225, 14 pages, dated Jan. 23, 2013.

* cited by examiner

*Primary Examiner* — Valentina Xavier
(74) *Attorney, Agent, or Firm* — Abelman, Frayne & Schwab

(57) ABSTRACT

A load attachment system for a helicopter including a load attachment coupling mounted to a helicopter, the load attachment coupling having a load point associated therewith forward of the standard hook attachment and below the center of gravity of the helicopter.

5 Claims, 2 Drawing Sheets

LOAD ATTACHMENT SYSTEM FOR HELICOPTERS

CLAIM FOR PRIORITY

This application claims priority to PCT/AU2010/001225, filed 20 Sep. 2010.

FIELD OF INVENTION

This invention relates to a load attachment system for helicopters. The invention has particular application to hauling cable by helicopter. However, the invention is not limited to this field of use.

BACKGROUND ART

Helicopters usually include a load attachment coupling in substantial alignment with the axis of rotation of the main lifting rotor. Such a system, referred to for convenience as a lifting hook or lifting point, and referred to herein as a standard lifting hook attachment, is satisfactory for most applications where a vertical lift is required. Vertical loads are sometimes lifted directly abeam the main rotor to provide for loading and unloading of the helicopter whilst in flight. Helicopters have also been used for hauling non-vertical loads, such as hauling cable. For example, in the construction and maintenance of power transmission cables, helicopters have on been used, particularly over precipitous or difficult terrain. However, the load that can be hauled by helicopter has been limited, and has been found to be considerably less than the vertical lifting capacity of the helicopter. Additionally, controlling the helicopter whilst hauling a non-vertical load has been found to be difficult.

A system using a mounting coupling mounted to the lifting hook (or the mounting for the lifting hook) has been used as described in Australian Patent Application No. 2006203572. However, such an arrangement fails to recognize or understand the effect of applying loads with non vertical components to an aircraft operating in a complex three dimensional equilibrium condition. As a result, operation of the aircraft using this arrangement causes significant and undesirable rolling under application of external hauling loads. The chosen attachment position also generates a requirement to provide more power to the tail rotor to maintain stability of the helicopter under normal operating conditions, further limiting hauling capacity and range of hauling angles available. Pilot visibility of the load being hauled and pilot comfort are also impaired in this arrangement. If a pilot attempts to direct the load forward, then more control input is required with a consequential loss of available power for hauling. If a pilot attempt to direct the load aft, there is a risk that the cable could contact the tail rotor and cause the aircraft to crash.

The present invention aims to provide a load attachment system for helicopters which alleviates one or more of the problems of the prior art. Other aims and advantages of the invention may become apparent from the following description.

DISCLOSURE OF THE INVENTION

With the foregoing in view, this invention in one aspect resides broadly a load attachment system for helicopters including:

a load attachment coupling mounted to a helicopter, the load attachment coupling having a load point associated therewith forward of the standard hook attachment or lifting point and below the centre of gravity of the helicopter.

In another aspect, the present invention resides broadly in a method of selecting a load point position for a helicopter for hauling a non-vertical load such that the load point position is forward of the standard hook attachment and below the centre of gravity of the helicopter. The height position of the load point is selected such that the sum of the moments and forces provides equilibrium about the centre of gravity when the helicopter is in flight.

In another aspect, this invention in one aspect resides broadly a load attachment system for helicopters including:

a load attachment coupling mounted to a helicopter and having a load point associated therewith positioned such that when loads with non-vertical components are applied, the helicopter pitches and rolls to an equilibrium position where stability and operating efficiency advantages are gained.

In another aspect, this invention resides broadly a load attachment system for helicopters including:

a load attachment assembly mounted to a helicopter, the load attachment assembly being formed to provide a load attachment coupling at a load point forward of the standard hook attachment or lifting point and below the centre of gravity of the helicopter.

The advantages are preferably gained by providing the load forward of the standard hook attachment or lifting point and below the centre of gravity of the helicopter. In one arrangement, the load point is further selected to a point abeam the centreline of the aircraft. Preferably, the load point is positioned outside the fuselage. Preferably, the load point is positioned such that, when in equilibrium in flight, a non-vertical load applied to the load attachment coupling is compensated by permitting the helicopter to pitch and roll to an angle which permits the pilot to observe the load. In a preferred arrangement, the pitch and roll angle are selected for visibility of the load and comfort of the pilot. For example, for a typical light turbine helicopter, the pitch and roll angle may be selected between 10° and 40° from vertical for a thrust angle between 1° and 10° from the pitch and roll angle whereby the load may be drawn at an angle of between 35° and 50° to the thrust angle.

The pitch and roll angle is the combined pitch angle and roll angle from vertical generated in reaction to the load applied to the load attachment coupling. Preferably, the load attachment coupling is mounted to the helicopter by secure fixing points. In a preferred form, the load attachment coupling is mounted to or formed at the end of a boom. In such form, it is preferred that the boom be mounted at or near each end to spaced mounting points on the helicopter.

For convenience, the end to or at which the load attachment coupling is mounted or formed is referred to herein as the coupling end, and the other end is referred to as the aft end. The aft end boom may be mounted to the aft landing strut at or near its end, or, if a skid is provided, to the skid of the helicopter at or near its attachment to the aft landing strut.

The coupling end of the boom may be mounted to the forward landing strut, preferably spaced inward therefrom and as high as is practical beneath the fuselage of the helicopter. In order to provide such an arrangement, it an oblique lateral strut may be operatively interposed between the distal end of the forward landing strut and the coupling end of the boom to separate the coupling end of boom inboard of the landing strut. Further, for such an arrangement, an oblique upright strut may be operatively interposed between mounting point of the forward landing strut to the fuselage and the coupling end of the boom to provide a secure spaced location of the load attachment beneath the fuselage of the helicopter.

In this specification, it will be appreciated that descriptions of mountings at or near particular points in spatial disposition in respect of an helicopter, intersections of intersecting elements and/or the ends of elements are given for clarity and succinctness of expression and are to be taken to include beside, proximate, close by, next to, in the vicinity of, and other mechanical equivalents, unless the context indicates otherwise. The struts and boom may be considered as constituent components in the load attachment assembly hereinbefore described.

In another aspect, the present invention resides broadly in a load attachment system for a helicopter including a boom having a load attachment coupling mounted to a coupling end and an aft end remote from the coupling end, the boom being mounted by its aft end to the aft landing strut and the coupling end being mounted to two or more intermediate struts operatively interposed between the coupling end and corresponding points along the forward landing strut such that the load attachment coupling is spaced inward of the distal ends of the landing struts below the fuselage and forward of the centre of gravity of a helicopter.

In another aspect, the present invention resides broadly in a load attachment system for a helicopter including a boom having a load attachment coupling mounted to a coupling end and an aft end remote from the coupling end, the boom being mountable by its aft end to the aft landing strut and the coupling end being mounted to two or more intermediate struts operatively interposed between the coupling end and mountable to corresponding points along the forward landing strut, the lengths and angles of the connections and mounting points being selected to provide the load attachment coupling at a location inward of the distal ends of the landing struts below the fuselage and forward of the centre of gravity of a helicopter when mounted thereto.

Preferably, the load attachment coupling is at a disposition with respect to the helicopter such that, when the helicopter is in equilibrium in flight, a load applied to the load attachment coupling is compensated by permitting the helicopter to pitch and roll to an angle between 10° and 40° from vertical for a thrust angle between 1° and 10° from the pitch and roll angle whereby the load may be drawn at an angle of between 35° and 50° to the thrust angle.

In such form, it has been surprisingly been found that the magnitudes of the loads which can be hauled with a significant non-vertical component greatly exceed the magnitudes of loads which can be lifted by the same aircraft vertically. Moreover, it has found that despite the helicopter undergoing both pitch and roll due to the offset of the load attachment coupling both forward and to the side of the centre of gravity, there is substantially no yaw loading with the result that the tail rotor is not required to draw substantially no more than minimal power from the main rotor. Moreover, the helicopter's natural righting tendency may produce a righting force which is substantially directed to the load being pulled by the load attachment coupling.

BRIEF DESCRIPTION OF THE DRAWINGS

In order that the invention may be more readily understood and put into practical effect, a preferred embodiment of the present invention will now be described with reference to the following drawings, and wherein.

DETAILED DESCRIPTION OF THE DRAWINGS

Figure 1:
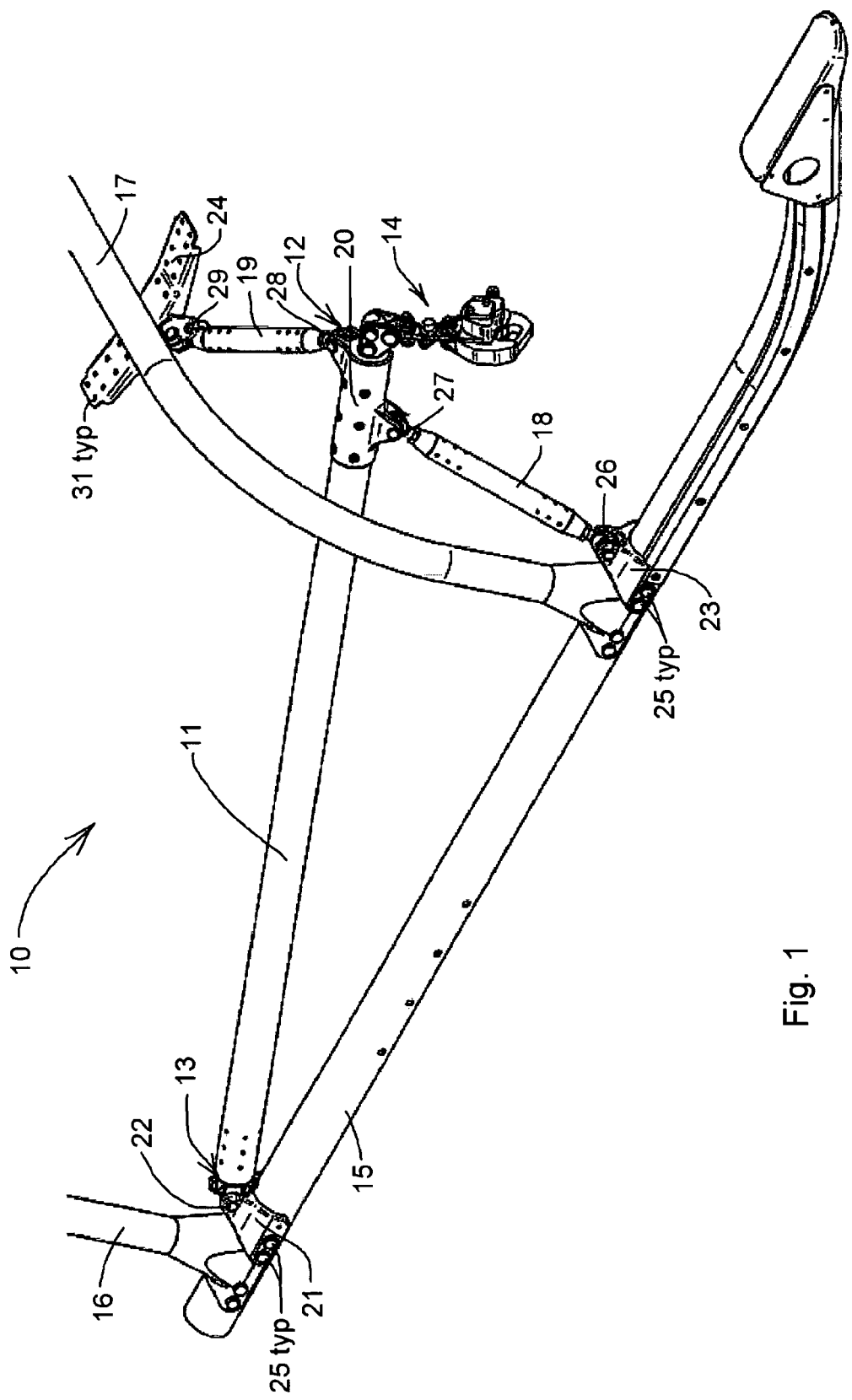
FIG. 1 is a pictorial view of a load attachment system for helicopters according to the invention.

The load attachment system 10 illustrated in FIGS. 1 to 5 includes a boom 11 extending between a coupling end 12 and an aft end 13 remote from the coupling end 12. The boom 11 is attached by its aft end 13 to a helicopter skid 15 just forward of and abutting its attachment to an aft landing strut 16. In order to provide the attachment, an aft connecting bracket 21 is provided. The aft connecting bracket 21 is fastened to the skid by four fasteners, two of which are shown typically at 25, and also provides an aft pivot connection at 22.

The coupling end of the boom is forward of the aft end and held in its disposition with respect to the helicopter 30 (not shown in FIG. 1) by two oblique struts, designated for convenience a lateral oblique strut 18 and an upright oblique strut 19. A coupling 14 is attached to the coupling end of the boom such that its disposition with respect to the helicopter is inward of and upward from the skid and forward at least as far as the forward landing strut of the helicopter. More particularly, the coupling is forward of and below the centre of gravity 36 of the helicopter, the centre of gravity being indicated by the encircled saltire cross, as well as being abeam of the central bisection of the helicopter.

The lateral oblique strut 18 is attached to the skid 15 forward of and abutting its connection to the forward landing strut 17. The attachment is provided by way of a forward landing strut connector bracket 23 which is fastened to the skid by four fasteners 25, two of which are shown.

The forward landing strut connector bracket 23 also provides a lower lateral pivot connection at 26 for the lower end of the lateral oblique strut 18 to connect to the boom 11. The upper end of the lateral oblique strut 18 is connected to the coupling end 12 of the boom 11 by the forward connector bracket 20 which also provides an upper lateral pivot connection at 28.

The upright oblique strut is attached to the helicopter at or near the connection of the forward landing strut to the fuselage. The attachment is provided by way of a fuselage connector bracket 24 which is fastened to the fuselage by up to twenty fasteners, not shown, but which would pass through at least some of the apertures shown typically at 31. The fuselage connector bracket also provides a lower upright pivot connection at 28 for the lower end of the upright oblique strut to connect to the boom. The upper end of the upright oblique strut is connected to the fuselage by the forward connector bracket which also provides an upper upright pivot connection at 29 to connect to the fuselage.

Although the various parts are connected to one another by five pivot connections at 22, 26, 27, 28 and 29, structural triangulation is provided by the connections at 22, 26 and 27 for lateral rigidity, and by the connections at 22, 28 and 29 for vertical rigidity with respect to the helicopter in its normal orientation.

Figure 2:
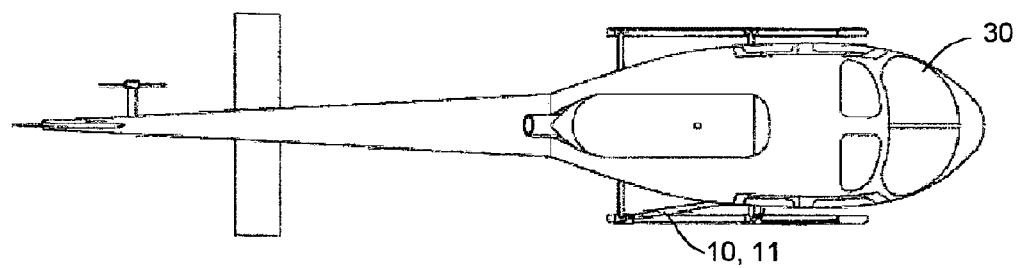
FIG. 2 is a plan view from above of a helicopter having the load attachment system of FIG. 1 mounted thereto.
Figure 3:
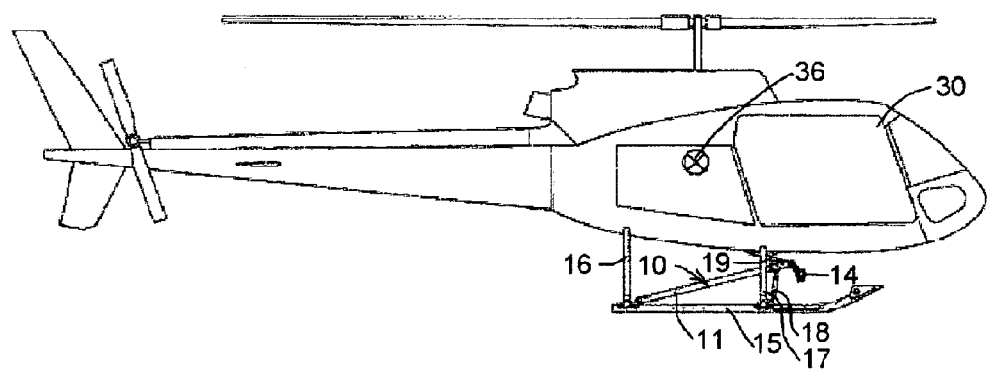
FIG. 3 is an elevation view from the right hand side of a helicopter having the load attachment system of FIG. 1 mounted thereto.
Figure 4:
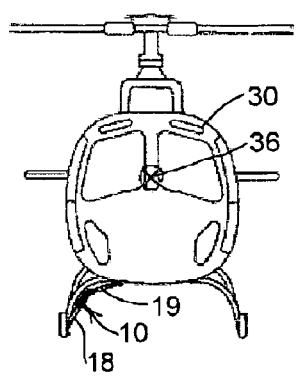
FIG. 4 is an elevation view from the front of a helicopter having the load attachment system of FIG. 1 mounted thereto.

The load attachment system shown in detail in FIG. 1 is shown in its disposition below the helicopter 30 in FIGS. 2, 3 and 4, in this particular instance, as it would be installed on an AS350 helicopter. It can be seen that the coupling 14 is below the fuselage 32, forward of the main rotor 33 and toward the right of the centre of the helicopter. It will be appreciated that this is convenient having regard to the typical positioning of the pilot to the right of the centreline of the helicopter. It will be further appreciated that if a helicopter is constructed with the pilot's seat to the left, then the load attachment system could be mounted to the left of the helicopter with equal effectiveness. Of course, with helicopters having a central pilot position, there would be a choice of left or right positions, but it is suggested that the controls of such helicopter are normally arranged for the right-handedness of the majority of pilots and therefore, there would be a slight preference to mount the load attachment system to the right. It will also be appreciated that if a helicopter is provided with windows which permit the pilot to see directly to the front of the helicopter, then the load point may be provided directly forward of the helicopter, but still below the centre of gravity, otherwise the helicopter would roll forward with the possibility that the main rotor could strike the load and have catastrophic consequences.

Reference will now be made to at least some of the design criteria adopted in the making of the invention. The complex three-dimensional equilibrium problem associated with scenario of pulling a cable by helicopter has not previously been significantly considered or understood. In order to simplify the problem, it is now suggested that two-dimensional vector models could be used to establish what should be the equilibrium performance response of the helicopter when pulling a cable, but covering sufficient co-ordinates and variables to provide a solution in three dimensions.

Reference will now be made to at least some of the design criteria adopted in the making of the invention. It has not been appreciated in the past that the scenario of pulling a cable by helicopter is a complex three-dimensional problem. In order to simplify the problem, it is now suggested that two-dimensional vector models could be used to establish what should be the equilibrium performance response of the helicopter when pulling a cable, but covering sufficient co-ordinates and variables to provide a solution in three dimensions.

From elementary vector mechanics, a body is in equilibrium when all net forces and moments equal zero. In the case of a helicopter pulling a cable (in this first instance, torque reaction and tail rotor effects being ignored) there are three basic forces present. These forces are the weight of the helicopter, the lift (or thrust) provided by the main rotor and the pulling force on the airframe.

For the helicopter to be in equilibrium under the action of the above mentioned forces, the forces must be concurrent, that is, they must pass through a common point. In the case of the helicopter, it is convenient to choose the common point to be on the line of action of the weight force acting through the centre of gravity of the helicopter.

It has surprisingly been found that by locating the coupling at the disposition according to the present invention, the helicopter can pull higher loads than it can in a vertical lift scenario. Given a constant pull force, and a constant aircraft mass, if the vertical pull angle is made smaller, the lift component of the main rotor thrust vector decreases, and the roll and pitch angle of the helicopter increases to maintain an equilibrium condition. This results in less power consumption and higher efficiency for pulling operations in for shallow pull angles. Hence the helicopter's roll and pitch attitude is an equilibrium response that can be utilised to reduce power consumption for a hauling load scenario. It is also of benefit that the pitch and roll attitude under load, once established is comfortable for the pilot because the backward roll is akin to allowing the pilot's seat to recline. Although there is a roll reaction, the reclining reaction ameliorates its effect.

Figure 5:
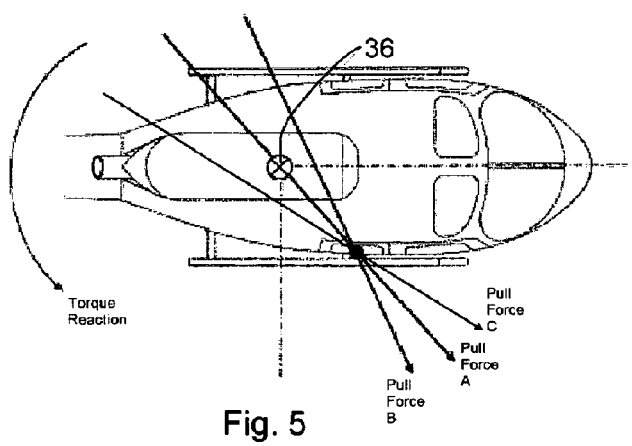
FIG. 5 is a diagrammatic plan view of the helicopter and load attachment system of FIGS. 2 to 4 showing vector details in relation thereto.

Referring to FIG. 5, observations can be made relating to the reaction of the aircraft with the load being pulled in alignment with the centre of gravity shown with the arrow designated "Pull Force A". If the alignment of the load is shifted to Pull Force B, the load direction passes forward of the centre of gravity, whereas at Pull Force C, the load direction passes behind the centre of gravity. Within at least this exemplary pulling envelope, the pilot has full control, and can make the torque reaction positive or negative. Such a feature has not been contemplated in the prior art. Moreover, such a feature accommodates other factors external to the helicopter and the load, such as wind gusts.

Since Pull Force A acts such that its line of action passes through the helicopter centre of gravity there is no moment about the centre of gravity due to that applied force. Pull Force B, produces a moment about the helicopter centre of gravity which in this case acts in the opposite sense to the torque reaction, and thus is beneficial in terms of reducing the work the tail rotor would be required to do otherwise to counteract the torque reaction. Of course, Pull Force C produces the opposite effect.

This added benefit can be built in to the system by shifting the pull point further forward in this case of the helicopter centre of gravity such that the pull force produces a moment to help counteract torque reaction. A pull force acting further forward (that is, pulled more to the side) further increases the opposing moment with an even larger moment arm from the helicopter centre of gravity. This results the tail rotor being required to do less work to counteract torque reaction on the helicopter. Therefore the positioning of the pull point relative to the helicopter centre of gravity in a top plane view can be used to improve tail rotor controllability.

The experiments further showed that the load attachment system according to the invention resulting in the following reduced power consumption, increased pilot comfort, increased pilot visibility, reduced pilot workload and increased operating safety.

Although the invention has been described with reference to a specific example, it will be appreciated by those skilled in the art that the invention may be embodied in other forms within the broad scope and ambit of the invention as herein set forth and defined by the following claims.

The invention claimed is:

1. A load attachment system for a helicopter having a standard hook attachment point and a centreline running forward to aft of the helicopter, the load attachment system including:
   a boom having ends and being mounted at or near each end to spaced mounting points on the helicopter;
   the spaced mounting points providing fixed placement of a load attachment coupling having a load point associated therewith abeam the centreline of the aircraft and forward of the standard hook attachment and below the centre of gravity of the helicopter; and
   a plurality of struts or stays providing bracing of the boom against a non-vertical load applied to the load point,
   wherein the load point is positioned such that, when in equilibrium in flight, the non-vertical load applied to the load attachment coupling is compensated by permitting the helicopter to pitch and roll to an angle which permits the pilot to observe the load, the pitch and roll angle being between 10° and 40° from vertical for a thrust angle between 1° and 10° from the pitch and roll angle whereby the load may be drawn at an angle of between 35° and 50° to the thrust angle.

2. A load attachment system for a helicopter having a standard hook attachment point and a centreline running forward to aft of the helicopter, the load attachment system including:
- a load attachment assembly mounted to a helicopter, the load attachment assembly being formed to provide a load attachment coupling at a load point abeam the centreline of the aircraft and forward of the position of the standard hook and below the centre of gravity of the helicopter and positioned such that, when in equilibrium in flight, the non-vertical load applied to the load attachment coupling is compensated by permitting the helicopter to pitch and roll to an angle which permits the pilot to observe the load, the pitch and roll angle being between 10° and 40° from vertical for a thrust angle between 1° and 10° from the pitch and roll angle whereby the load ma be drawn at an angle of between 35° and 50° to the thrust angle, whereby
- a load with a non-vertical component when applied, causes the helicopter to pitch and roll to an equilibrium position where stability and operating efficiency advantages are gained.

3. The load attachment system according to claim 2, wherein the load attachment coupling is mounted to or formed at the end of a boom having ends and being mounted at or near each end to spaced mounting points on the helicopter.

4. The load attachment system according to claim 3, wherein the boom includes a coupling end to or at which the load attachment coupling is mounted or formed and an aft end at the other end of the boom, the aft end boom being mounted to an aft landing strut at or near its end, or, if a skid is provided, to the skid of the helicopter at or near its attachment to the aft landing strut.

5. The load attachment system according to claim 4, wherein the coupling end of the boom is mounted to a forward landing strut, spaced inward therefrom and spaced beneath the fuselage of the helicopter.

* * * * *